UNITED STATES PATENT OFFICE.

GEORGE H. SELLERS, OF WILMINGTON, DELAWARE.

METHOD OF PURIFYING WATER.

SPECIFICATION forming part of Letters Patent No. 564,940, dated July 28, 1896.

Application filed September 6, 1895. Serial No. 561,649. (No specimens.)

*To all whom it may concern:*

Be it known that I, GEORGE H. SELLERS, a citizen of the United States, residing in Wilmington, in the county of New Castle, in the State of Delaware, have invented a certain new and Improved Method of Purifying Water, of which the following specification is a true and exact description.

My invention relates to the purification of water, and has for its object to, in the first place, impregnate the water with a salt of iron, and then to bring about a precipitation of the iron and with it of deleterious impurities in the water.

Heretofore particles and pieces of metallic iron have been agitated in moving currents of water, the attrition of the iron on itself and the action of the water bringing about a solution of a portion of the iron as, it is supposed, ferrous carbonate, which, upon subsequent aerification, was oxidized and precipitated from the water as ferric hydrate, the precipitation occurring in a sedimentation-tank or in or adjacent to a filter through which the water passes.

While the above-described treatment has been found very efficacious in many instances, in others it has proved impossible to secure satisfactory results or results at all resembling those secured in other places. This, I have ascertained, is due to the quantity of acid present in the water under treatment, those waters which carry in solution a relatively considerable amount of acid bringing about the formation of a soluble salt of iron, which is subsequently precipitated with the advantageous results above noted, while those waters which contain an insufficient percentage of acid are but little if at all affected by the treatment with iron.

Now I have discovered that by bringing about a galvanic action upon the iron it, or rather the salts formed from it, are taken into solution and precipitated from solution in all kinds of water, both those which give satisfactory results where the iron is used alone and those which under such conditions give the most unsatisfactory results, and I bring about the desired galvanic action by the simple expedient of mixing with the mass of iron particles, bars, or other pieces of iron, a relatively small portion of pieces of a metal, such as copper, tin, lead, or other material which will form what I may call a "galvanic couple," with the iron and bring about the galvanic action which I have found to facilitate the formation and solution of the iron salt and its action as a coagulant in the settling-tank or filter into which the water is passed.

It will be understood that an agitation of the mass of iron and the other metal or metals is necessary in order to prevent the formation of insoluble salts or oxids on the surface of the iron and of the other metal, and also, no doubt, to facilitate the throwing off of the soluble salts by its being loosened by attrition from the surface of the iron.

The aerification of the water can be effected in any convenient way. I prefer that air be forced into it both before and after it comes in contact with the mass of iron and other metals, having found that the best results are secured by this double aerification. The manner in which the metal particles, bars, or scrap should be agitated may be left to the choice of the operator, any of the many well-known devices for agitating iron in contact with water being well adapted for use with my process, and, indeed, any convenient method of agitating the iron will answer the purpose.

Having now described my invention, what I claim as new, and desire to secure by Letters Patent, is—

1. The method of purifying water which consists in agitating therein pieces of iron in direct contact with pieces of another metal with which the iron can form a galvanic couple so as to facilitate the formation of an iron salt, soluble in the water.

2. The method of purifying water which consists in agitating therein pieces of iron in direct contact with pieces of another metal with which the iron can form a galvanic couple so as to facilitate the formation of an iron salt soluble in the water and then forcing air through the water thus impregnated with the iron salt in order to form a coagulant and precipitate the iron and impurities.

3. The method of purifying water which consists in first forcing air into the water, then agitating therein pieces of iron in direct contact with pieces of another metal with which the iron can form a galvanic couple so as to facilitate the formation of an iron salt soluble in the water and then forcing air through the water thus impregnated with the iron salt in order to form a coagulant and precipitate the iron and impurities.

GEO. H. SELLERS.

Witnesses:
ROBERT W. LLOYD,
FRANCIS T. CHAMBERS.